(12) United States Patent
Harrup et al.

(10) Patent No.: US 7,285,362 B2
(45) Date of Patent: Oct. 23, 2007

(54) SAFE BATTERY SOLVENTS

(75) Inventors: Mason K. Harrup, Idaho Falls, ID (US); Joseph R. Delmastro, Idaho Falls, ID (US); Frederick F. Stewart, Idaho Falls, ID (US); Thomas A. Luther, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 493 days.

(21) Appl. No.: 10/848,480

(22) Filed: May 17, 2004

(65) Prior Publication Data

US 2005/0255385 A1    Nov. 17, 2005

(51) Int. Cl.
*H01M 6/16* (2006.01)
*H01M 6/14* (2006.01)

(52) U.S. Cl. .................. 429/328; 429/329; 429/330; 429/303

(58) Field of Classification Search .......... 429/303, 429/328, 330
See application file for complete search history.

(56) References Cited

U.S. PATENT DOCUMENTS

| | | | |
|---|---|---|---|
| 3,994,996 A | 11/1976 | Franko-Filipasic et al. | |
| 5,174,923 A | 12/1992 | Chen et al. | |
| 5,830,600 A * | 11/1998 | Narang et al. | 429/326 |
| 6,475,679 B1 * | 11/2002 | Tsutiya et al. | 429/339 |
| 6,544,690 B1 | 4/2003 | Harrup et al. | |
| 6,645,675 B1 * | 11/2003 | Munshi | 429/305 |
| 6,955,867 B1 | 10/2005 | Otsuki et al. | |
| 7,008,564 B2 | 3/2006 | Harrup et al. | |
| 7,060,744 B2 | 6/2006 | Murakami et al. | |
| 7,074,256 B2 | 7/2006 | Stewart et al. | |

* cited by examiner

*Primary Examiner*—Patrick Joseph Ryan
*Assistant Examiner*—Thomas H. Parsons
(74) *Attorney, Agent, or Firm*—Trask Britt

(57) ABSTRACT

An ion transporting solvent maintains very low vapor pressure, contains flame retarding elements, and is nontoxic. The solvent in combination with common battery electrolyte salts can be used to replace the current carbonate electrolyte solution, creating a safer battery. It can also be used in combination with polymer gels or solid polymer electrolytes to produce polymer batteries with enhanced conductivity characteristics. The solvents may comprise a class of cyclic and acyclic low molecular weight phosphazenes compounds, comprising repeating phosphorus and nitrogen units forming a core backbone and ion-carrying pendent groups bound to the phosphorus. In preferred embodiments, the cyclic phosphazene comprises at least 3 phosphorus and nitrogen units, and the pendent groups are polyethers, polythioethers, polyether/polythioethers or any combination thereof, and/or other groups preferably comprising other atoms from Group 6B of the periodic table of elements.

10 Claims, 12 Drawing Sheets

SAFE BATTERY SOLVENTS

GOVERNMENT RIGHTS

The United States Government has rights in the following invention pursuant to Contract No. DE-AC07-99ID13727 between the U.S. Department of Energy and Bechtel BWXT Idaho, LLC.

BACKGROUND OF THE INVENTION

1. Field of the Invention

The present invention relates to ion-transport-enhancing materials that may be used as a liquid component/additive in conventional "liquid" batteries, in solid batteries, and/or gel battery electrolytes. More specifically, the present invention relates to additives that comprise cyclic phosphazenes with polyethers, polythioethers, or other groups that comprise ion-transport-enhancing groups. Furthermore, embodiments of the present invention relate to liquid components/additives that may be used to replace conventional electrolyte additives that have conventionally been volatile, unstable, flammable, and/or toxic, and therefore that have conventionally posed safety and health issues.

2. Background Art

A battery typically comprises one or more electrochemical cells connected in series, parallel or both, depending on desired output voltage and capacity. Batteries can be grouped in two categories. Primary batteries are single-use, non-rechargeable energy storage devices. Secondary batteries are rechargeable and are intended for multiple uses. However, all batteries have certain characteristics in common. They all have cathodes and anodes. There must also be an ion carrier that is capable of transporting ions between electrodes when the battery is charging or discharging.

The ion transport material can be an electrolyte solution or a polymer. In the lithium ion battery industry, both of these ion transport mechanisms are used in commercial batteries.

Cells featuring electrolyte solutions are typically called "Liquid" cells and are comprised of a cathode and anode separated by a porous polymer separator. An electrolyte solution placed between the electrodes transports ions between the cathode and the anode. The typical solvent is a mixture of organic carbonates such as ethylene carbonate, diethylene carbonate, etc, and the most common electrolyte is $LiPF_6$. However, $LiBF_4$ and $LiClO_4$ can also be used.

Polymer cells have the same general design, except that the separator and the free solution are replaced by either a solid polymer electrolyte (SPE) or by a polymer "sponge" that is imbibed with traditional electrolyte solution. The advantages of polymer batteries are that they can be made to be thinner than conventional batteries. Also, because they do not have free solution, they do not require hard cases. Thus, they can be produced in flexible formats.

Battery cathodes are produced by applying a dispersion of finely-divided cathode powder and very finely divided carbon suspended in a solvent and polymer binder to a substrate. The most commonly used substrate is aluminum plated on a polyester film, such as available under the DuPont trademark MYLAR® (E. I. Du Pont De Nemours and Company WILMINGTON Del.). The resulting metalized film serves as a support for the cathode powder and as a current collector.

Anodes may be made of pure metal, alloys, or non-metallic powders coated on metalized film. In secondary lithium batteries, the film is copper-coated polyester. Non-metallic powders are applied to the film in a manner that is similar to that of the catodes.

A variety of cathodes and anodes can be used with lithium batteries. Primary batteries are most commonly comprised of manganese dioxide cathodes and lithium metal anodes. Secondary batteries typically use lithium cobalt oxide cathodes and carbon anodes. However, a large number of other cathode and anode materials have been described in the literature and some are commercially available. The following cathode materials are by no means an exhaustive list: lithium nickel oxide, lithium manganese oxide, lithium cobalt nickel oxide, and the like. Anodes could include lithium metal, carbon, oxides of titanium, or vanadium and the like.

In primary batteries, discharging occurs when lithium metal is oxidized to lithium cations, which are transported to the cathode where they move into the manganese dioxide crystal lattice. It is not safe to recharge these batteries. The reason is that repeated cycling with a lithium anode creates dendrites that grow out from the surface of the lithium metal. These whiskers will ultimately touch the cathode, creating a short circuit. For this reason, lithium metal is not a commonly-used anode for rechargeable lithium batteries.

The charge-discharge cycle of secondary batteries is similar to that of the primary battery. Lithium cations leave the anode and are transported to the cathode, typically $LiCoO_2$, where they move into the crystal lattice. On charging, lithium cations are transported from the cathode to the anode. Carbon anodes are different from lithium metal anodes. Lithium is not actually plated on the carbon, as it is on lithium metal. Instead, the lithium ions are transported to specific sites in the carbon lattice where they form stable associations. A similar mechanism occurs with other non-metallic anodes.

By far the most common secondary lithium batteries are "liquid" cells. They are used in cell phone, computer, and camcorder applications. Of these, the cell phone applications are the most demanding. When cell phones transmit, a very large energy demand is placed on the battery. The electrochemical response is electricity production and release of lithium cations from the anode. Transport of lithium ions to the cathode becomes the rate limiting step in the process. Thus, excellent transport characteristics are necessary for the battery to function effectively. This is where liquid cells outperform polymer batteries. The solvent/electrolyte system that is employed in commercial lithium ion batteries provides very high lithium concentrations and low viscosity. Thus, transport is very good. Unfortunately, these systems also have some negative characteristics. Depending on the particular carbonate solvent(s) that is chosen, the flash point can range from 33° C. to 132° C. The other problem with them is that they are volatile. As the temperature rises, the vapor pressure also increases. These two characteristics can be very problematic in batteries that are subject to overheating.

Overheating can be a particular problem with lithium ion batteries depending on the application. When lithium ions intercalate into, or transport out of, the lithium cobalt oxide crystal, lattice shifts occur that release thermal energy. Normally this is not a problem. However, if a battery is under very heavy demand, the resultant heating can become significant. For example, if a cell phone with a lot of peripherals, such as a color screen or camera feature, is transmitting a large amount of data, the battery can undergo a significant amount of heating. As the battery heats up, the vapor pressure of the solvent increases. If the rate of thermal release is greater than the natural cooling of the battery, then the pressure could possibly exceed the structural limits of the case, leading to a rupture of the case. Under this scenario, the hot vapor may rapidly mix with oxygen in the air. Since the carbonate solvent in the battery would presumably be above their flash points, a fire could possibly result if an initiation such as a spark or other heat source were present.

Battery manufacturers have been aware of the potential for such an event since the beginning of the lithium ion battery industry. To counter the potential, they have included computerized fuses that create an open circuit when conditions in the battery are outside critical ranges. They also incorporate special membrane separators that lose their porosity when temperatures exceed critical amounts, thereby "shutting down" the battery.

Unfortunately, even with these safeguards, there have still been incidents of exploding cell phone batteries. Thus, it is clear that the safety measures employed by the battery industry might be improved upon.

Another battery system that could benefit from these new solvents according to embodiments of the invention is large lithium ion battery systems such as power tool batteries and hybrid electric vehicle batteries. Lithium ion batteries have been largely excluded from these markets due to the potential for explosion and fire. The use of phosphazene solvents according to embodiments of the invention could be enabling in these systems, eliminating the potential for battery rupture and fire.

The only way to substantively change the risk profile of lithium ion batteries is to change the components to materials that fundamentally diminish the probability of cell rupture and fire. A prime candidate for improvement is the solvent system, and the invented solvents address this need.

SUMMARY OF THE INVENTION

The invention comprises a novel ion transporting solvent that maintains very low vapor pressure, contains flame retarding elements, and is nontoxic. The solvent in combination with common battery electrolyte salts can be used to replace the current carbonate electrolyte solution, creating a safer battery. It can also be used in combination with polymer gels or solid polymer electrolytes to produce polymer batteries with enhanced conductivity characteristics.

The invented solvents comprise a class of cyclic and acyclic low molecular weight phosphazene compounds, comprising repeating phosphorus and nitrogen units forming a core backbone and ioncarrying pendent groups bound to the phosphorus. In preferred embodiments, the cyclic phosphazene comprises at least 3 phosphorus and nitrogen units, and the pendent groups are polyethers, polythioethers, polyether/polythioethers (mixed oxygen and sulfur in a single pendent group), or any combination thereof, and/or other groups comprising other atoms from Group 6B of the periodic table of elements.

A preferred embodiment of the additive comprises a P—N core with polyether pendent groups, with oxygen linkages directly to the backbone phosphorus atoms. A plurality of the pendent groups feature oxygen bound to the phosphorus that is "direct O—P linkages." Each O—P structure and especially each O—P—O structure, created by oxygen of one or two pendent polyethers bound to the same phosphorus, respectively, forms a "pocket." The electrochemical and stearic characteristics of these pockets are believed to be particularly well adapted for attracting metal cations away from their corresponding anions, while still allowing for mobility of the cations. The oxygen atoms each have an effective radius that is well-adapted to form a small pocket, which reduces the effectiveness of ionic chelation in the pocket due to stearic constraints. Also the oxygen is an easily polarizable "soft" center. These characteristics are believed to reduce the effective interaction between metal cations, such as lithium and the pocket, due to electronic constraints. The result of this is that the chelating characteristics of the solvent are strong enough for effective solvation of cations, yet weak enough to allow efficient transfer to cathode or anode structures.

A more preferred embodiment of the additive comprises a P—N core with polythioethers pendent groups, with sulfur linkages directly to the backbone phosphorus atoms. A plurality of the pendent groups feature sulfur bound to the phosphorus that is "direct S—P linkages." Each S—P structure, and especially each S—P—S structure, created by sulfur of one or two pendent polyethers bound to the same phosphorus, respectively, forms a "pocket." The electrochemical and stearic characteristics of these pockets are believed to be particularly well adapted for attracting metal cations away from their corresponding anions, while still allowing for mobility of the cations. The sulfur atoms each have an effective radius that is well-adapted to form a small pocket, which reduces the effectiveness of ionic chelation in the pocket due to stearic constraints. Also the sulfur is an easily polarizable "soft" center. These characteristics are believed to reduce the effective interaction between metal cations, such as lithium and the pocket, due to electronic constraints.

The sulfur atoms in the embodiments featuring S—P and/or S—P—S structures are softer than oxygen atoms in the embodiments featuring O—P and/or O—P—O structures. Thus, they have even less affinity to ions such as lithium, making them and their respective polyphosphazene embodiments even more effective ion carriers.

It is also believed that cation mobility is further enhanced by the presence of distal oxygen and/or distal sulfur in the pendent groups of the invented solvents. For example, as shown in FIGS. 2-6, one may see distal oxygen and/or distal sulfur spaced along the length of the pendent groups. It is believed that the distal oxygen and/or sulfur contribute to the cations "skipping" and/or "hopping" along the molecules and from molecule to molecule in the preferred solvents of the invention.

The solvents described in this patent can be used alone, in any ratioed combination with other phosphazene solvents, or other solvents such as organic carbonates.

Further, the invented additive(s) may also be used in improved molecular composite SPE's such as "self-doped" electrolytes of the type disclosed in U.S. Pat. No. 6,544,690, entitled "Self-Doped Molecular composite Battery Electrolytes.

Thus, it is an object of the present invention to provide a versatile class of compounds for including in conventional or polymer batteries, resulting in safer battery systems.

DETAILED DESCRIPTION OF THE INVENTION

Referring to the figures, there are shown several, but not the only, embodiments of the invented solvent. The additive of the present invention may be used in electrolytes for primary batteries and also secondary batteries, for example, disposable lithium batteries and rechargeable lithium batteries. Additives according to the invention preferably are used with lithium as the battery cation, but they also may be used with H, Na, Mg, Al, etc.

Figure 1:
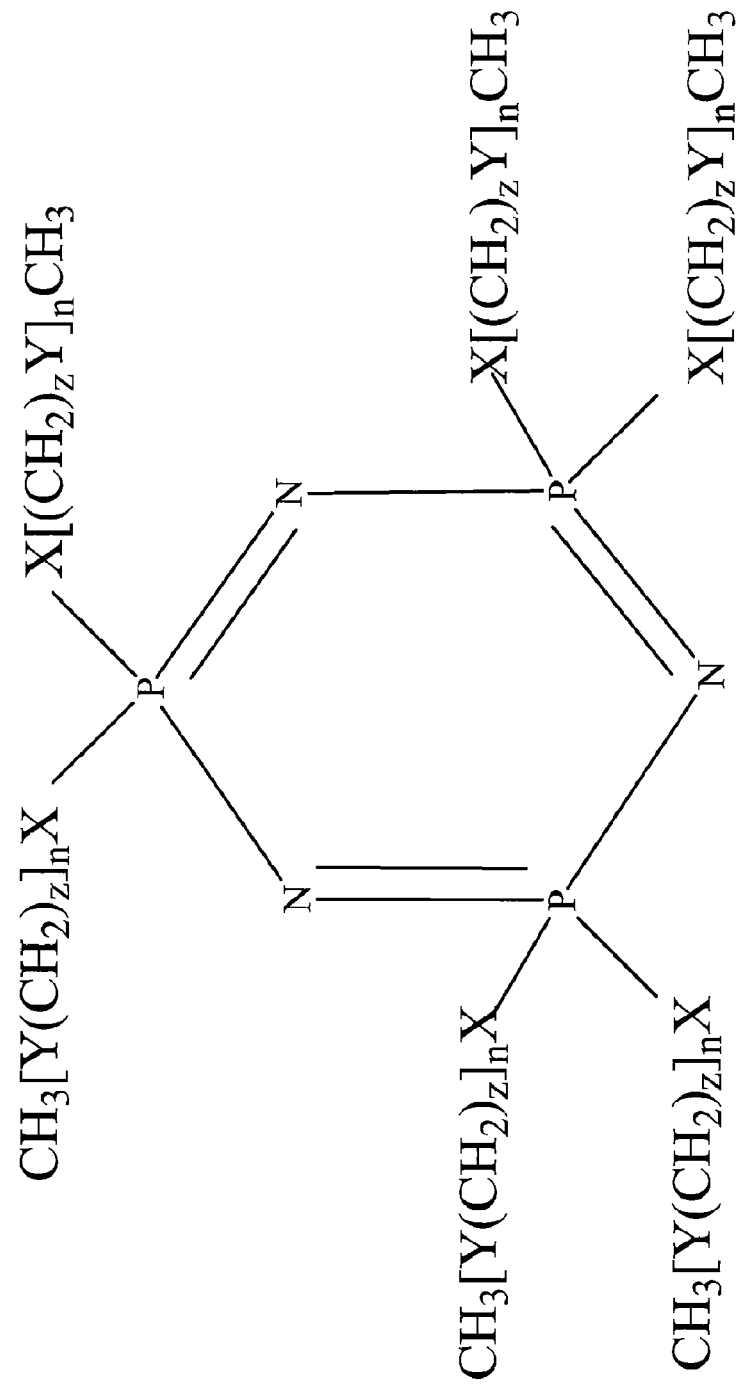
FIG. 1 is a schematic of one embodiment of the cyclic phosphazene.

The preferred additive is a cyclic phosphazene, comprising a cyclic core of preferably at least 3 (PN) repeat units and most preferably 3-10 of said repeat units. Each PN unit comprises a double bond between the phosphorus and the nitrogen and two pendent groups bound to the phosphorus. Each PN unit is bound to other PN units on either side by single bonds, forming the cyclic core. FIG. 1 illustrates a cyclic phosphazene suitable for use in connection with the present invention.

Preferred pendent groups are ligands covalently bonded to the PN cyclic core, specifically to the phosphorus, with the ligands comprising ion carrying groups adapted for enhancing cation mobility. Such ion carrying groups include ethylene oxy or ethylene thiol groups, or mixed ethylene oxy and thiol groups. It is envisioned that other Group 6B elements may be effective in pendent groups according to the invention. Therefore, the currently preferred pendent groups are represented in FIG. 1 as $CH_3(YCH_2CH_2)_nX$, with X and Y being oxygen and/or sulfur atoms, and/or other group 6B elements, and various combinations thereof. The possible combinations of pendent groups are many, due to the possibility of each pendent group comprising different X and Y atoms, comprising different numbers n, and pendent groups being arranged in different order relative to each other on the cyclic core.

Pendent groups preferably comprise 1-10 ethylene units ("n" in FIG. 1), and the pendent groups on a particular cyclic phosphazene may all have identical "n," all have different "n," or some combination thereof. Thus, total chain length for each pendent group may vary widely. Further the pendent groups may also be linear, branched beyond the primary ethylene unit, or combinations thereof. For example, alternative pendent groups may include branching, such as CH3(YHCRCH2)n(YCH2CH2)X and/or CH3(YCH2HCR)n(YCH2CH2)X, wherein X and Y are oxygen and/or sulfur atoms, and/or other Group 6B elements, and various combinations thereof, and wherein R represents groups attached to X and Y. R can be any organic group such as, but not limited to, alkyls, alkenes, alkynes, aryls, aldehydes, ketones, aromatics, cyclics, heterocyclics, and the like.

The currently preferred methods produce additives wherein oxygen, and more preferably sulfur are directly linked to the phosphorus of the cyclic core. The two molecules directly linked to each phosphorous (oxygen and/or sulfur) surround and define, with their respective phosphorus, a "pocket" for temporarily holding a metal ion. Thus, in the preferred embodiments, such a pocket may be an O—P—N pocket, an O—P—O pocket, an S—P—N pocket, and/or an S—P—S pocket, for example. With 3 or more pockets in each solvent molecule, spaced apart around the cyclic core, metal ions may skip or hop from pocket to pocket on a single additive molecule and then from pocket to pocket on the next additive molecule, and/or from a single pocket on the next additive molecule, and/or from a single pocket on an additive molecule to a single pocket on an adjacent additive molecule, for example. By selecting what atoms are directly-linked to the phosphorous, that the additive molecule may be adapted to comprise pockets of a size and electronic affinity that is sufficient to solvate metal cations but weak enough to allow easy transference of the cation to either the cathode or the anode.

Figure 2:
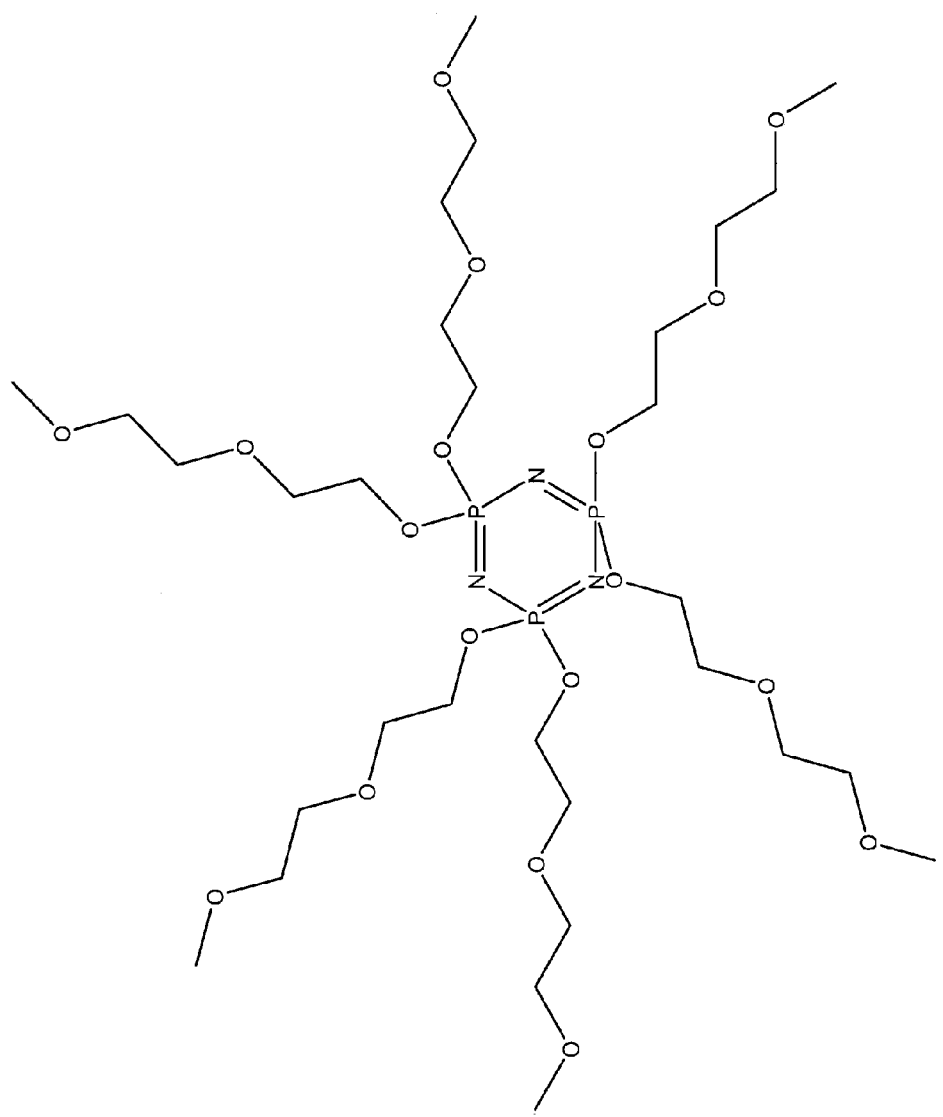
FIG. 2 is a formula representing one embodiment of the invention, including three PN units in a cyclic core and pendent groups with oxygen directly linked to the phosphorus atoms of the cyclic core, wherein this embodiment is termed "Hexa-MEEP-T."

One additive according to the invention comprises a cyclic phosphazene trimer, called "Hexa-MEEP-T," named for the cyclic ring of three PN units, the six 2-(2-methoxyethoxy)ethanols attached to the phosphorus, and T for "trimer." This cyclic phosphazene, shown in FIG. 2, comprises ethylene oxy pendent groups, so that, using the terminology of the general formula of FIG. 1, m is 3, both X and Y are oxygen, and n is 2. the ethylene units are linear. Thus, this cyclic phosphazene is symmetrical, with all pendent groups being identical.

Hexa-MEEP-T may be synthesized by the following method:

Example of Synthesis of Hexa-MEEP-T

1) Preparation of alkoxide Solution

A magnetic stir bar and a $N_2$ gas purge line were added to a previously oven-dried two liter round-bottom flask. To this apparatus was charged 103 grams of 2-(2-methoxyethoxy) ethanol ("MEE") and 1 liter of anhydrous 1,4-dioxane. To this mixture was added 18.8 grams of freshly-cut sodium metal. The resulting mixture was heated to reflux with stuffing and $N_2$ purge for at least 15 hours. Completion of the reaction was determined as the point in time at which no sodium remained. The heat was removed and the resulting mixture was allowed to cool to room temperature.

2) Preparation of Phosphazene Solution

In another oven-dried flask, 20 grams of hexachlorocyclotriphophazene was dissolved in 150 ml of anhydrous 1,4-dioxane and entered into a previously oven-dried 250 ml pressure-equalizing addition funnel.

3) This solution was added to the alkoxide solution slowly (over 30 minutes) to control the reaction rate. The reaction exhibited a large degree of self-heating due to the exothermic nature of the reaction between the alkoxide and the phosphazene. The reaction was then stirred for 15 minutes, and then quenched by pouring the reaction solution in 2 liters of deionized water.

4) Extraction of Hexa-MEEP-T

Crude Hexa-MEEP-T was collected through extraction of the aqueous solution with methylene chloride, followed by rotary evaporation, which isolated a pale yellow oil. This oil was found to consist of the desired product and unreacted MEE. Removal of MEE was effected by dilution of the oil in water and extraction with three separate portions of diethyl ether. The product was then isolated from the aqueous phase through extraction with methylene chloride. Removal of the methylene chloride yielded Hexa-MEEP-T in the amount of 25.8 grams, corresponding to a 53-wt % yield.

One may see from this example, and from the examples in FIGS. 3-6, that the resulting pendent ligands are dependent upon the reactant selected for substitution onto the cyclic phosphorus. The selection of MEE results in the pendent groups being linear polyethers, with two ethylene repeat units per pendent group. The selection of MEE as the only alkoxide results in all of the pendent groups being the same. Alternative reactant selection will result in alternative pendent groups, for example, other alkoxides may be used instead of MEE, or mixed with MEE, and this will result in alternative pendent groups and/or mixed pendent groups. For example, if one type of alkoxide is selected, the synthesis results in all pendent groups being identical and of the same general structure as the alkoxide, bound to the phosphorus of the cyclic core at a primary oxygen of the alkoxide. If several different alkoxides are selected, then the product cyclic phosphazene will have a mixture of pendent groups, representing the types and generally the relative percentages of the various alkoxides added in the synthesis.

Figure 7:
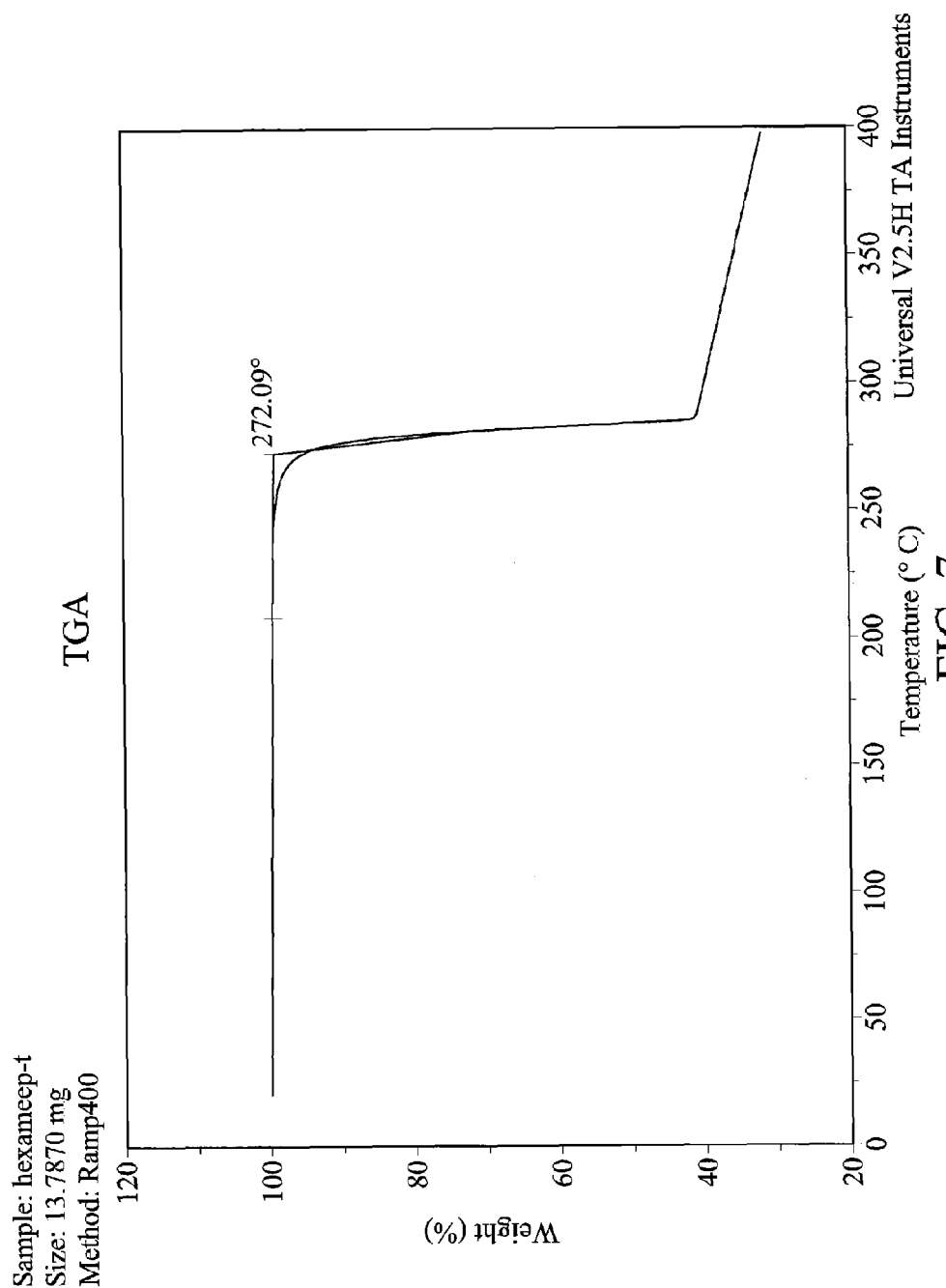
FIG. 7 is a TGA analysis of Hexa-MEEP-T of FIG. 2.
Figure 8:
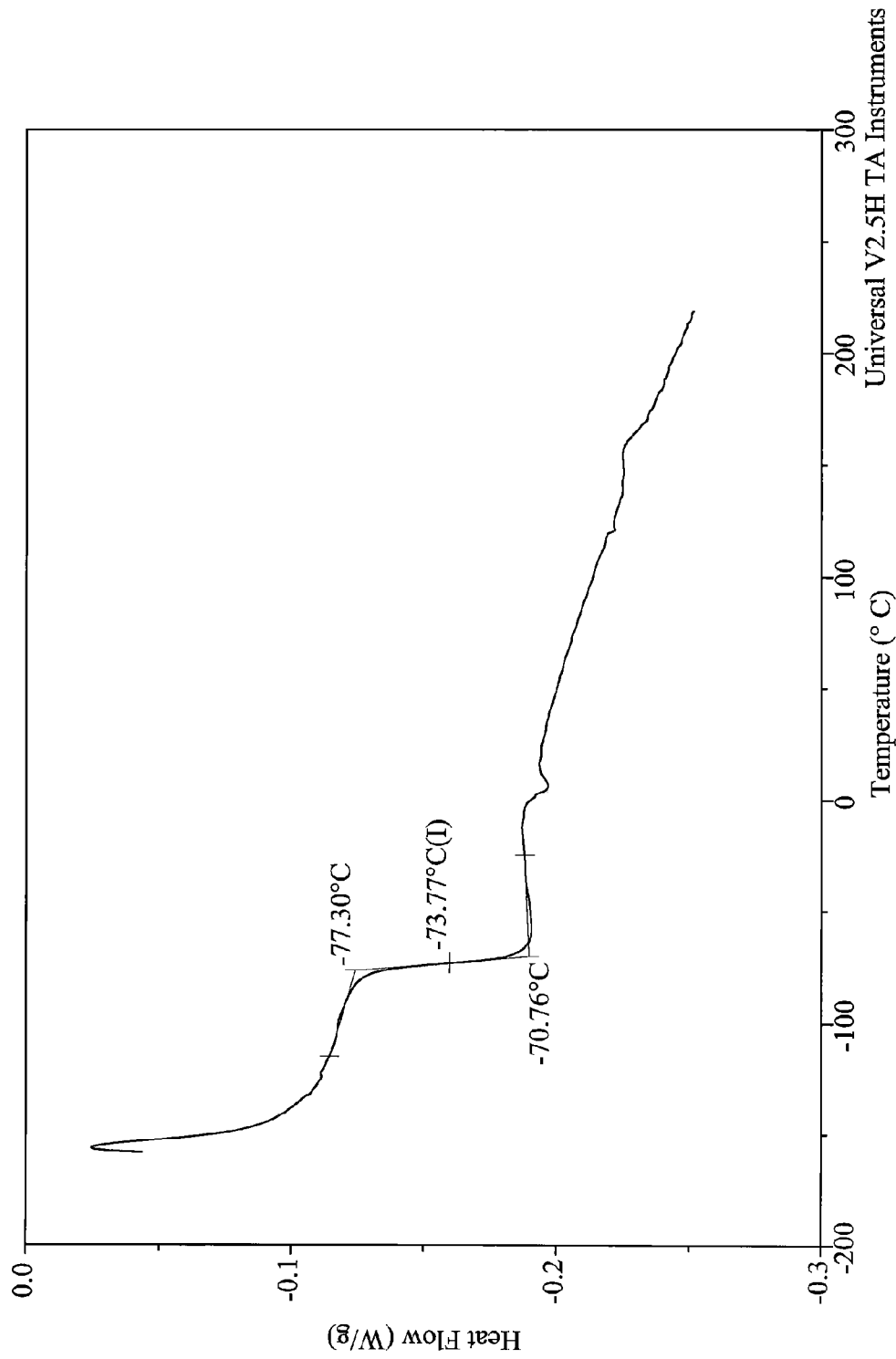
FIG. 8 is a DSC analysis of Hexa-MEEP-T of FIG. 2.

The invented solvent Hexa-MEEP-T has been characterized for its thermal and molecular properties as shown in FIG. 7-10. FIG. 7 is illustrates Thermogravometric Analysis (TGA) of Hexa-MEEP-T, showing decomposition temperature at 272.09° C. FIG. 8 illustrates DSC analysis of Hexa-MEEP-T, showing glass transition temperature between −77.3 to −70.76° C. These thermal analyses indicate that batteries based on Hexa-MEEP-T could function over a temperature range of about −70° C. to about 270° C., if other components could also survive. Most significantly, the TGA analysis indicates that the solvent maintains a very low vapor pressure up to the point where it begins decomposing. This would eliminate a mechanism for cell rupture.

Figure 9:
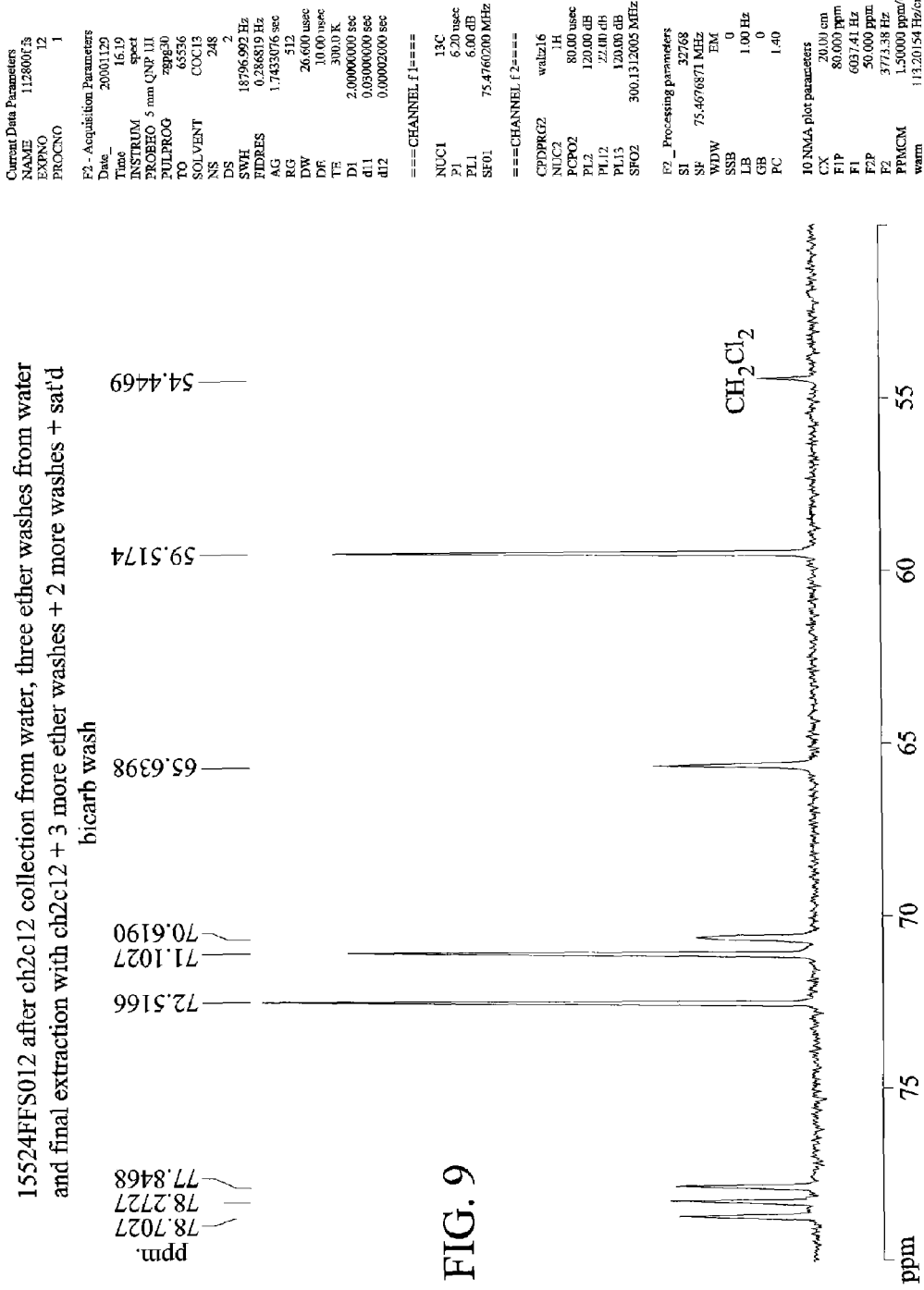
FIG. 9 is a NMR analysis of Hexa-MEEP-T of FIG. 2.
Figure 10:
FIG. 10 is further NMR analysis of Hexa-MEEP-T of FIG. 2.
Figure 10:

FIGS. 9 and 10 illustrate multinuclear NMR testing of Hexa-MEEP-T.

Example of Application of Novel Solvent in Battery

As an example, a Hexa-MEEP-T compound was applied to an SPE, which was in turn fabricated into a battery cell, according to the following methods. A molecular composite SPE made by methods according to U.S. Pat. No. 6,544,690 was produced, with MEEP as the polymer component and silicate as the ceramic component. The SPE was formulated and dried, as described in that patent, into an approximately 150 micron thick film. U.S. Pat. No. 6,544,690 is incorporated herein by this reference.

This fully-formed and dried film was cut to one-inch square and placed onto a prepared lithium foil electrode with a copper current collector in an argon atmosphere glove box, thereby producing an anode/SPE laminate. To this molecular composite was added 5 wt % of Hexa-MEEP-T, in two equal increments. Between applications of the increments of additive, the Hexa-MEEP-T was allowed to permeate the composite SPE for several minutes to avoid overloading the surface of the composite, which would induce a "curling effect." The composite was allowed to equilibrate for several more minutes until it adopted a uniform gelled appearance. The cathode (a lithiated cobalt oxide on an aluminum current collector) was placed onto the anode/SPE laminate and sealed in an inert housing, thereby forming a full battery cell.

Comparative Performance

Figure 11:
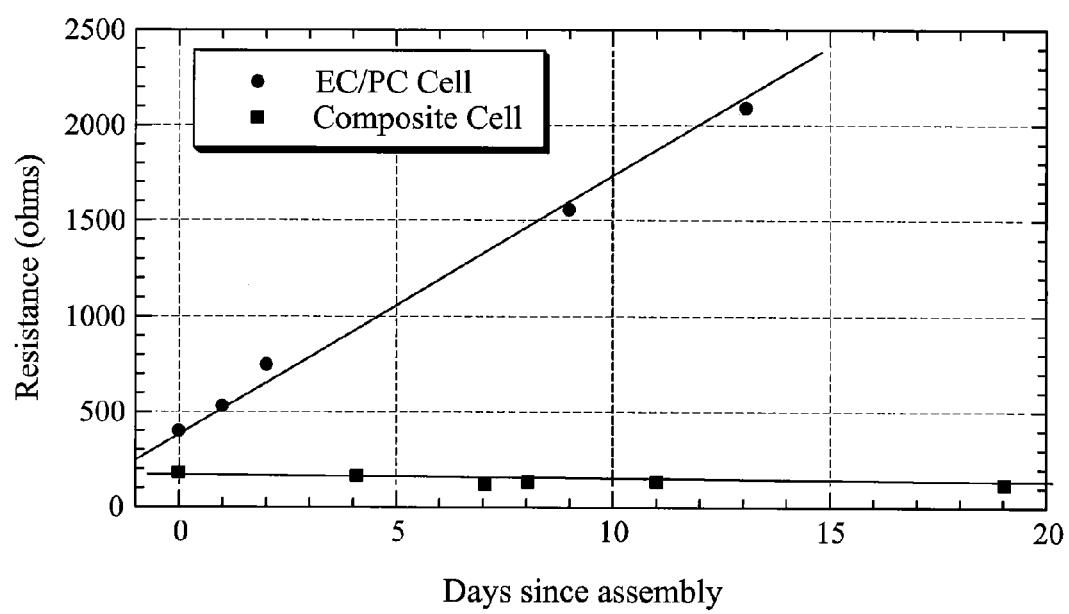
FIG. 11 illustrates continuous cycling performance of an experimental cell prepared with conventional materials compared to an experimental battery prepared with one embodiment of the invented solvent, wherein resistance is plotted vs. days.

A battery cell was made using a lithium anode, an SPE according to the above methods including the invented Hexa-MEEP-T additive, and a cobalt oxide microparticle cathode. This invented cell was compared to a conventional cell made with EC/PC/DME/$LiPF_6$ imbibed into CELLGUARD® (Martin Mariette Magnesia Specialties, LLC LTD LIAB CO Raleigh N.C.) magnesium oxide film, with the only difference between the invented cell and the conventional cell being the composition of the electrolyte and liquid additives. Both cells were charged and recharged at a C/3 rate, 24 hours/day 5 days per week. Periodically, the resistance of both the conventional cell and the cell with Hexa-MEEP-T additive were monitored and the data points taken and plotted in FIG. 11. The cell containing the invented solvent out-performed the conventional cell, by maintaining its initial resistance for the full test period. However, the resistance of the conventional cell continually increased through the test period.

Hexa-methoxyethylthiocyclophosphazene of Hexa-MEET and Poly[bis(2(-methoxyethoxy)alkylthiophosphazene]

Figure 3:
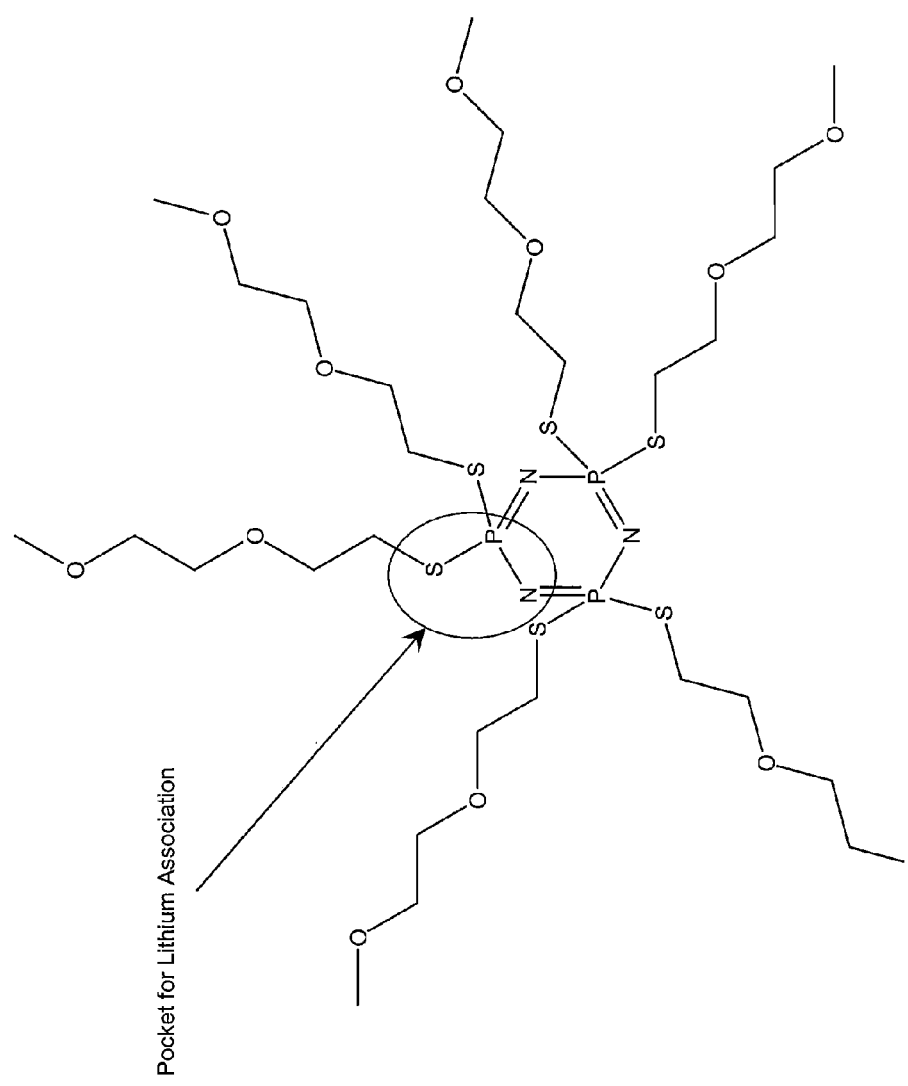
FIG. 3 is a formula representing one alternative thiol embodiment of the invention with branched pendent groups and sulfur directly linked to the phosphorus of the cyclic core.
Figure 4:
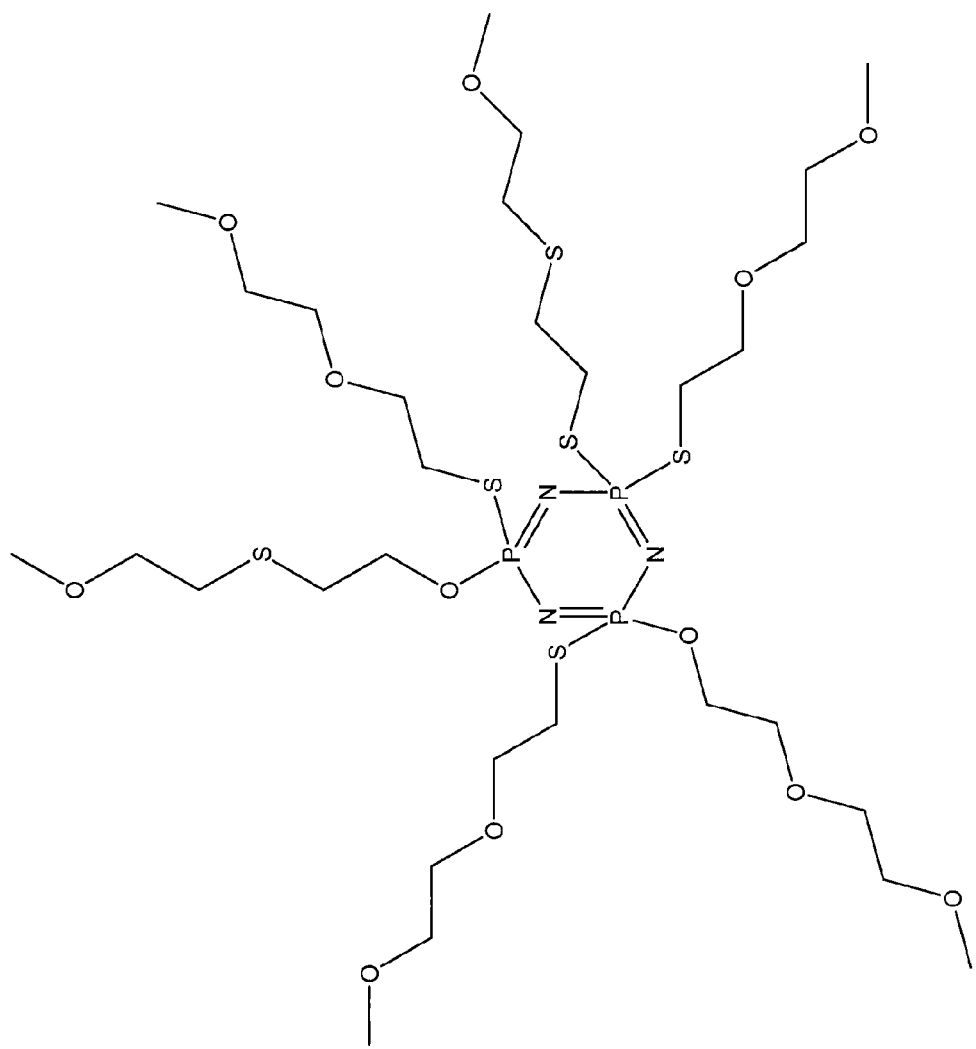
FIG. 4 is one example of a cyclic phosphazene with mixed ether and thioethers and mixed oxygen and thio linkages to the central P—N ring.
Figure 5:
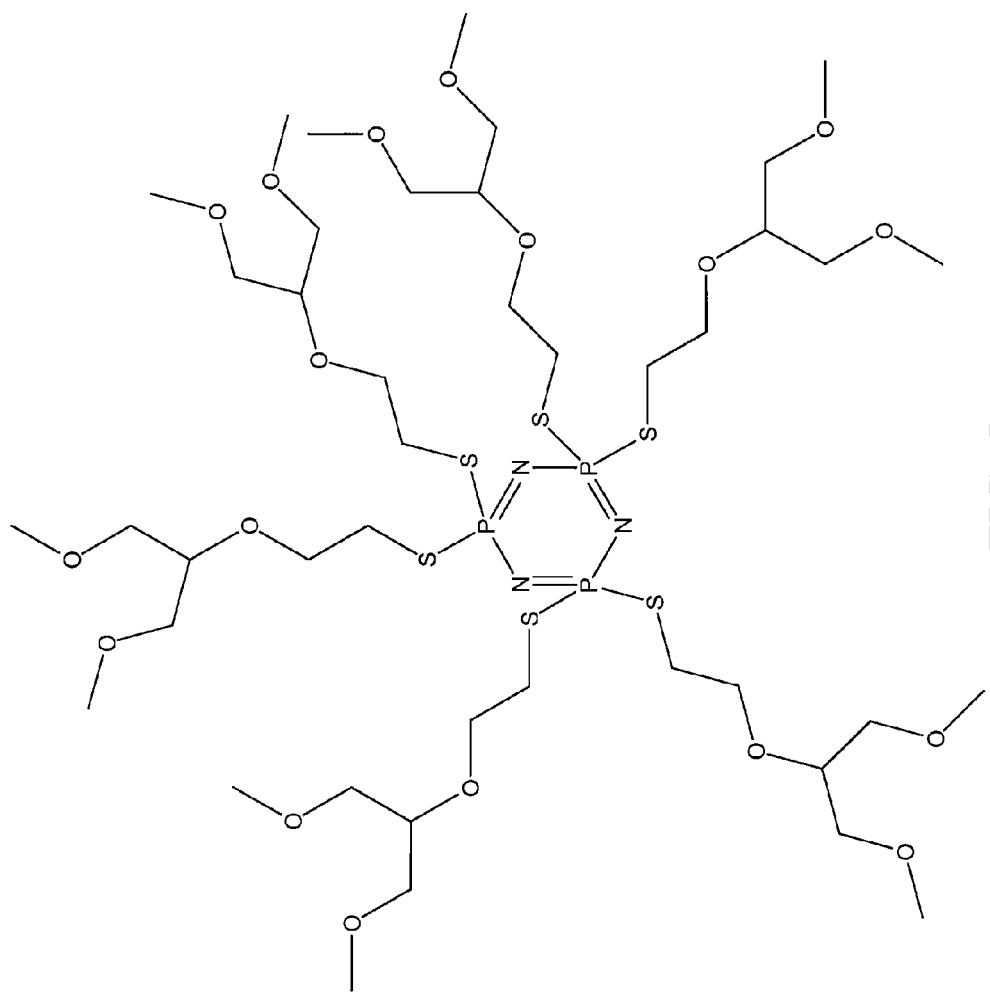
FIG. 5 is one example of branched polyether arms with thiol linkages to the central P—N ring.
Figure 6:
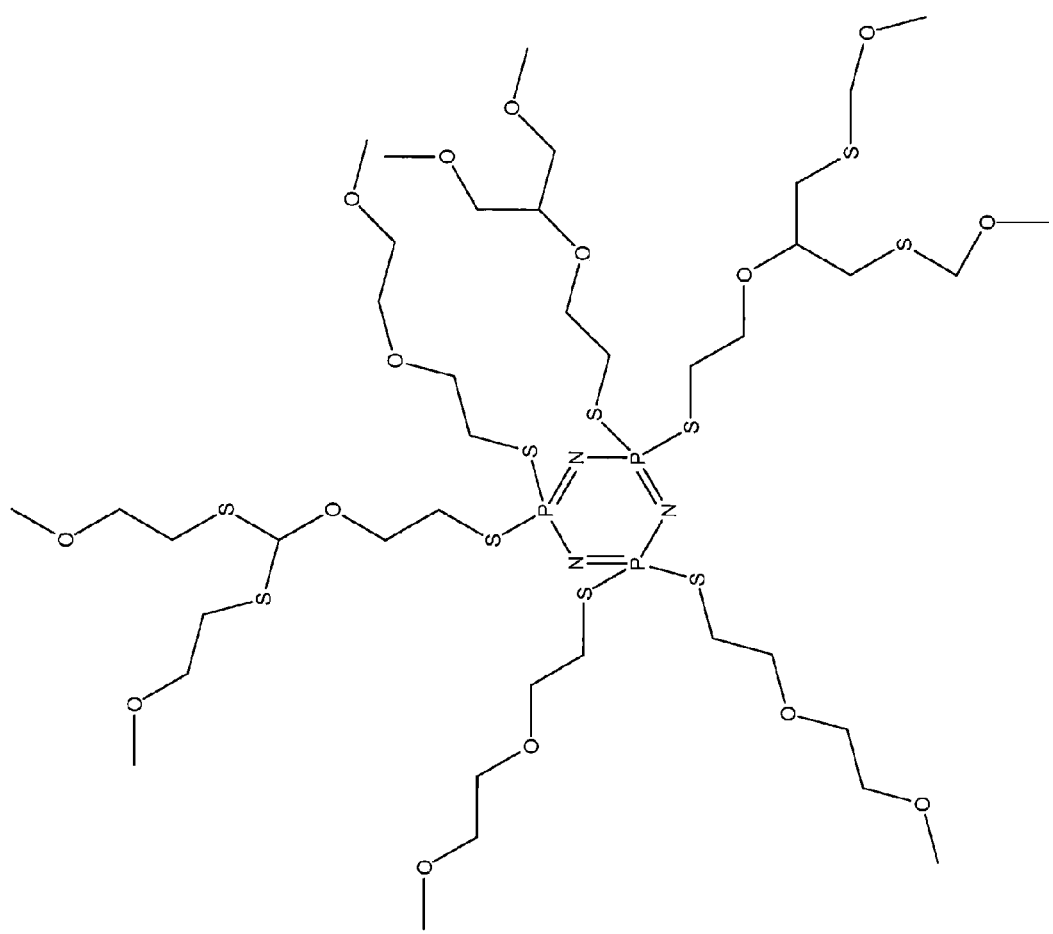
FIG. 6 is one example of branched and unbranched, polyether and polyether/thioether arms.

An other embodiment of the invention comprises an additive with at least one, and preferably a plurality of, thiol pendant groups with sulfur directly linked to the phosphorus backbone. Preferably, the "backbone" is in the form of a cyclic core, of 3-10 PN units. Directly linked to each phosphorus are two sulfurs that, with the phosphorus, form a pocket for temporarily receiving mobile lithium or other mobile cations. The preferred additive may comprise subunits as shown in FIG. 3. A compound comprising three of these units is also portrayed in FIG. 3, wherein the pocket is circled and labeled. The inventors believe that the direct linkages between the sulfur and the phorphorus create especially effective pockets due to the relative large sulfur radii (compared to oxygen) and due to the relatively "soft" center. The large radii and soft center are believed to reduce the effective interaction between the metal cation (for example, lithium) and the pocket due to electronic constraints, and hence, are believed to increase cation mobility.

The compound of FIG. 3 may be prepared by the following method:

EXAMPLE 1

Synthesis of poly[bis(2-2-methoxyethoxy)ethanethio)phosphazene] (MEET-P)

1. Preparation of Thiolate Solution:

A mechanical stirrer, $N_2$ gas spurge, and a water condenser were added to a previously-oven-dried one liter round-bottom flask. To this apparatus was charged 37.2 grams of 2-(2-methoxyethoxy)ethanethiol (MEET) and 400 ml of anhydrous 1,4-dioxane. To this mixture was added 7.3 grams of sodium hydride (80% dispersion in mineral oil) under a $N_2$ gas purge for an additional 30 minutes.

2. Preparation of Phosphazene Solution:

In another oven-dried flask, 10.1 grams of freshly prepared and purified polydichlorophosphazene was dissolved in 150 ml of anhydrous toluene.

3. Addition of Polydichlorophosphazene:

The polydichlorophosphazene/toluene solution was added slowly (over 30 minutes) to the stirring thiolate solution under $N_2$ gas spurge. After the addition was completed the reaction mixture was heated to 70° C. and stirred under $N_2$ for an additional seven hours. The reaction was allowed to cool to room temperature and then quenched by precipitating the polymer in 1.5 liters of hexane, followed by dissolving and neutralizing the crude MEET-P in 250 ml of nanopure $H_2O$ at 5° C.

4. Purification of MEET-P

The crude MEET-P/$H_2O$ solution was allowed to warm slightly to 12° C. whereupon the polymer was forced out of the highly ionic solution due to the phase transition behavior that is associated with the lower critical solubility temperature (LCST) of the polymer. This procedure was performed a second time to remove more of the residual salts from the polymer. Final purification was accomplished by dialysis against nanopure $H_2O$ and removal of the $H_2O$ by rotary evaporation yielded 1.1 grams of MEET-P, corresponding to a 4% yield.

The resulting solvent is suitable for use as a battery solvent by itself or in combination with other solvents. It may also be useful as an additive to SPE based batteries.

The above examples illustrate only some of the possible compositions that could be prepared, and we do not intend to limit this invention to those examples.

EXAMPLE 2

A Lithium Ion Battery Prepared with Hexa-MEEP-T Solvent

A cathode, consisting of lithium cobalt oxide deposited on an aluminum and polymer current collector, and an anode, consisting of carbon deposited on a copper and polymer current collector are separated with a porous plastic separator. The electrodes and separator are placed in an air tight cell case.

A solution of Hexa-MEEP-T saturated with $LiPF_6$ is inserted into the cell case, being careful to eliminate all gas bubbles.

The resulting battery is electrically connected to an automatic cycler. The battery cell is repeatedly charged and discharged. Electrochemical performance is monitored automatically with each cycle.

After 100 cycles, the battery performance is observed to be essentially unchanged.

EXAMPLE 3

Lithium Ion Battery Prepared with a Mixed Carbonate Solvent

A battery essentially identical to the previous example is prepared except that the battery solvent is a mixture of ethylene carbonate and diethylene carbonate with LiPF6.

The battery is also charged and discharged for 100 cycles. As with the previous example, there is very little change in electrochemical performance in the battery.

The significance of the last two examples includes that Hexa-MEEP-T functions as an effective battery solvent.

EXAMPLE 4

Thermal Testing of a Phosphazene-Based Battery

The battery of Example 2 is placed in a high temperature chamber. The cell is equilibrated to 150° C. The battery is then taken through 100 discharge/charge cycles. The battery performance is consistent with the last cycle performing similarly to the first.

Figure 12:
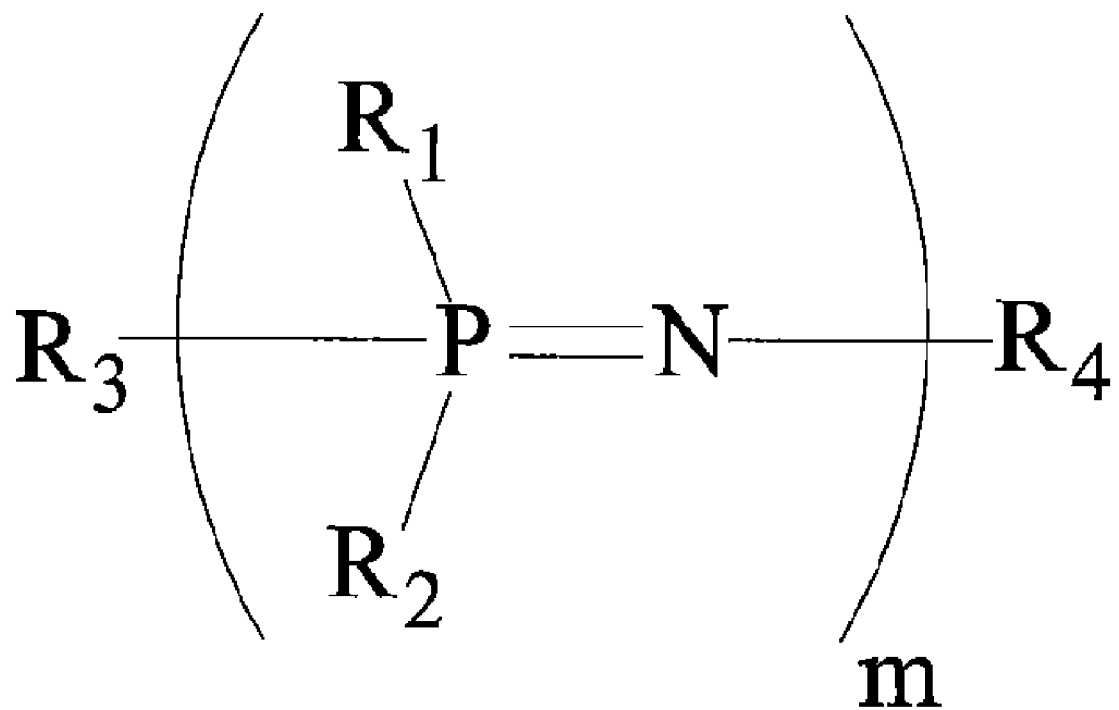
FIG. 12 illustrates an exemplary linear phosphazene that may be useful in embodiments of the invention.

Thus, one may see from the above Description and Examples, that many electrolyte solvents are envisioned by the inventors, which may find application in electrolytes that are much safer than current commercial products. While it is prefeffed that cyclic phosphazenes according to embodiments of the invention comprise all of the electrolyte solvent in a primary or secondary battery, without conventional organic and/or other solvents, the inventors also envision that lesser amounts of the invented cyclic phosphazenes in other solvents may also be effective, especially in reducing the vapor pressure above the electrolyte. Further, the inventors envision that traces and impurities of non- cyclic phosphazene materials, from manufacture, downstream processing, or other handling, may be in the electrolyte with such embodiments still being within the scope of the invention. Preferably, but not necessarily, there is no fluorine or other halogen in the prefeffed embodiments of the invented electrolytes. The preferred embodiments feature full substitution of preferred pendant groups on the phosphorous of the phosphazene phosphorous-nitrogen units. While the prefeffed embodiments comprise cyclic phosphazene, the inventors envision that some embodiments of linear phosphazene may be designed to have some of the benefits of the preferred embodiments, for example, as illustrated in FIG. 12, where M=1-6, R1 and R2 are X/Y groups described below. R3, and R4 can be X/Y groups, but can also be selected from, but not limited to hydrogen, alkyls, alkenes, alkoxides, polvethers, polythioethers, siloxanes, etc. X/Y groups are of the form;

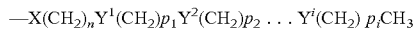

and m=3-6, n=1-6, and X and Y are oxygen, sulfur or Group 6B elements, $p_1$ through $p_i$=1-6. It is also recognized the X/Y groups could be branched and could have other groups, such as F, etc substituted for hydrogen.

Although this invention has been described above with reference to particular means, materials, and embodiments, it is to be understood that the invention is not limited to these disclosed particulars, but extends instead to all equivalents within the scope of this Description and the Drawings.

The invention claimed is:

1. A battery comprising a cathode, an anode, a polymer comprising a solid polymer electrolyte, a solvent containing at least one cyclic phosphazene compound, and an electrolyte salt.

2. The battery of claim 1, wherein the polymer comprises a composite of an ion-transporting polymer and an inorganic ion carrier.

3. The battery of claim 1, wherein the polymer functions as a host for an electrolyte solution.

4. The battery of claim 1, further comprising a porous separator.

5. The battery of claim 1, further comprising at least one non-phosphazene battery solvent.

6. The battery of claim 5, wherein the at least one non-phosphazene battery solvent comprises an organic carbonate solvent.

7. The battery of claim 5, wherein the at least one non-phosphazene battery solvent is selected from the group consisting of ethylene carbonate, diethylene carbonate, and propylene carbonate.

8. The battery of claim 5, wherein the at least one non-phosphazene battery solvent is soluble in at least one phosphazene solvent.

9. A battery comprising: a cyclic phosphazene compound comprising sulfur.

10. The battery of claim 9, wherein the cyclic phosphazene compound comprises an electrolyte solution of the battery.

* * * * *